(12) United States Patent
Bodtker et al.

(10) Patent No.: US 11,097,776 B2
(45) Date of Patent: Aug. 24, 2021

(54) NESTED ENERGY ABSORPTION STRAP ASSEMBLY

(71) Applicant: STEERING SOLUTIONS IP HOLDING CORPORATION, Saginaw, MI (US)

(72) Inventors: Joen C. Bodtker, Gaines, MI (US); Randy Jones, North Branch, MI (US); Jorge Flores, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 348 days.

(21) Appl. No.: 16/146,689

(22) Filed: Sep. 28, 2018

(65) Prior Publication Data
US 2019/0100243 A1    Apr. 4, 2019

Related U.S. Application Data

(60) Provisional application No. 62/565,641, filed on Sep. 29, 2017.

(51) Int. Cl.
*B62D 7/22* (2006.01)
*F16F 7/12* (2006.01)
*B62D 1/19* (2006.01)

(52) U.S. Cl.
CPC .............. *B62D 7/22* (2013.01); *B62D 1/195* (2013.01); *F16F 7/123* (2013.01)

(58) Field of Classification Search
CPC combination set(s) only.
See application file for complete search history.

(56) References Cited

U.S. PATENT DOCUMENTS

| 9,428,215 B1 * | 8/2016 | Nagatani | B62D 1/195 |
| 10,023,223 B2 * | 7/2018 | Anspaugh | B62D 1/184 |
| 2020/0031382 A1 * | 1/2020 | Strong | B62D 1/195 |

* cited by examiner

*Primary Examiner* — Paul N Dickson
*Assistant Examiner* — Matthew D Lee
(74) *Attorney, Agent, or Firm* — Dickinson Wright PLLC

(57) ABSTRACT

An energy absorption strap assembly for a steering column is provided. The assembly includes an upper jacket. The assembly also includes a first energy absorption strap extending from a first end to a second end, the first energy absorption strap operatively coupled to the upper jacket proximate the second end of the first energy absorption strap. The assembly further includes a second energy absorption strap surrounding a portion of the first energy absorptions strap, the second energy absorption strap not directly coupled to the upper jacket.

13 Claims, 5 Drawing Sheets

NESTED ENERGY ABSORPTION STRAP ASSEMBLY

CROSS-REFERENCE TO RELATED APPLICATIONS

This patent application claims priority to U.S. Provisional Patent Application Ser. No. 62/565,641, filed Sep. 29, 2017, which is incorporated herein by reference in its entirety.

BACKGROUND

The embodiments described herein relate generally to steering columns and, more particularly, to an energy absorption strap assembly for steering columns.

Some energy absorbing steering columns provide two states of energy absorption. For example, if the passenger is unbelted it may be desired to absorb more energy in the steering column as it is collapsed due to an energy absorbing event (e.g., a collision). If the occupant is belted to the seat, less energy dissipated by the steering column may be adequate.

A switching mechanism is required to select between the high and low energy modes. When in the lower energy absorbing state, the switching mechanism disconnects the EA straps so that only the main strap undergoes the rolling action. The auxiliary strap does not roll, but only translates with the upper jacket.

If the roll is viewed as a U-shaped locus of points, the roll from the main strap will advance at half the rate or distance traveled of the upper jacket. Simultaneously, the roll from the auxiliary strap will advance at the same rate and distance as the upper jacket.

Since the available length inside the lower jacket is a fixed entity, a provision for the non-rolling strap travel must be made. This provision can take the form of an extra opening for which the roll can travel through or extra force resisting the travel of the upper jacket. There may not be room for an extra aperture and the extra force may be undesirable for occupant safety.

SUMMARY OF INVENTION

In accordance with one aspect of the disclosure, an energy absorption strap assembly for a steering column is provided. The assembly includes an upper jacket. The assembly also includes a first energy absorption strap extending from a first end to a second end, the first energy absorption strap operatively coupled to the upper jacket proximate the second end of the first energy absorption strap. The assembly further includes a second energy absorption strap surrounding a portion of the first energy absorptions strap, the second energy absorption strap not directly coupled to the upper jacket.

In accordance with another aspect of the disclosure, an energy absorption strap assembly for a steering column is provided. The assembly includes a lower jacket and an upper jacket telescopingly engaged with the lower jacket. The assembly also includes a first energy absorption strap extending from a first end to a second end, the first energy absorption strap operatively coupled to the upper jacket proximate the second end of the first energy absorption strap, the first energy absorption strap including a curved portion between the first end and the second end of the first energy absorption strap. The assembly further includes a second energy absorption strap extending from a first end to a second end, the second energy absorption strap including a curved portion between the first end and the second end of the second energy absorption strap, the curved portion of the second energy absorption strap surrounding the curved portion of the first energy absorption strap.

In accordance with another aspect of the disclosure, an energy absorption strap assembly for a steering column is provided. The assembly includes a lower jacket and an upper jacket telescopingly engaged with the lower jacket. The assembly also includes a first energy absorption strap extending from a first end to a second end, the first energy absorption strap operatively coupled to the upper jacket proximate the second end of the first energy absorption strap, the first energy absorption strap including a curved portion between the first end and the second end of the first energy absorption strap. The assembly further includes a second energy absorption strap extending from a first end to a second end, the second energy absorption strap including a curved portion between the first end and the second end of the second energy absorption strap, the curved portion of the second energy absorption strap surrounding the curved portion of the first energy absorption strap, the second energy absorption strap not directly coupled to the upper jacket. The assembly yet further includes a locking pin moveable between an extended position and a retracted position, the locking pin extending through the second energy absorption strap in the extended position, the locking pin withdrawn from the second energy absorption strap in the retracted position, the extended position defining a high load mode of the energy absorption strap assembly, the retracted position defining a low load mode of the energy absorptions strap assembly.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, illustrated is an energy absorption (EA) strap assembly for a vehicle steering column. As described herein, the EA strap assembly is implemented in a two-stage EA strap system. The system includes two EA straps which are configured to be switched between a high load condition and a low load condition. As will be appreciated from the disclosure herein, the EA strap control assembly allows an auxiliary strap to advance in a synchronized manner with the main strap in both activated (i.e., high load condition) and deactivated modes (i.e., low load condition).

Figure 1:
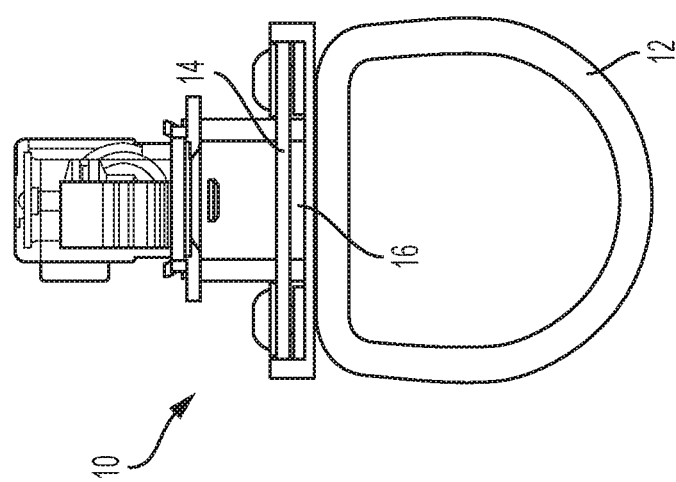
FIG. 1 is an end view of an energy absorption strap assembly for a vehicle steering column.
Figure 2:
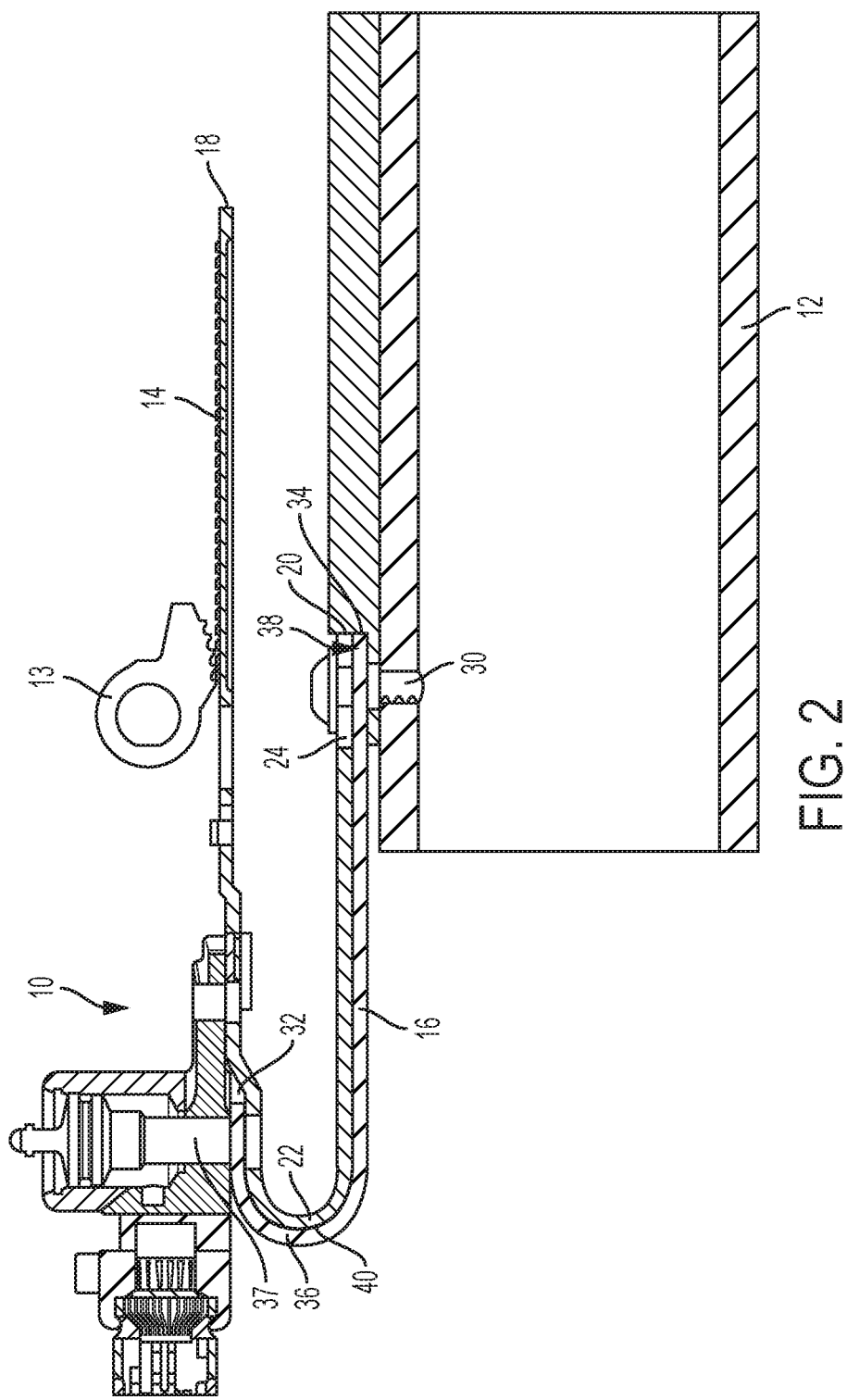
FIG. 2 is a side, elevational view of the energy absorption strap assembly.
Figure 5:
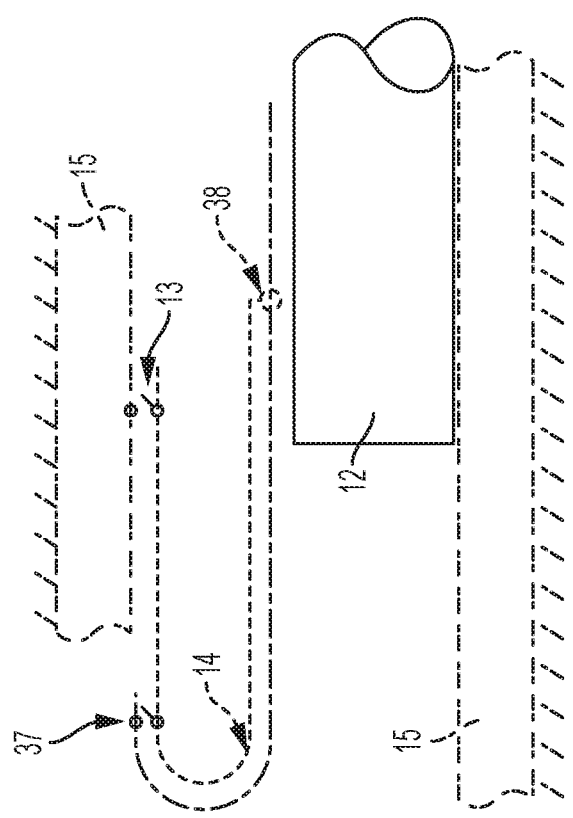
FIG. 5 is a schematic illustration of the energy absorption strap assembly.

Referring now to FIGS. 1 and 2, an EA strap assembly is illustrated and generally referenced with numeral 10. The EA strap assembly 10 is operatively coupled to one or more components of a steering column assembly. The steering column assembly includes an upper jacket 12 and a lower jacket 15 (FIG. 5) that are telescopingly engaged with each other in an axial direction (i.e., longitudinal direction of steering column).

The steering column may be used in any type of vehicle that requires steering operation. A mounting bracket is operatively coupled to the steering column to allow adjustment or relative motion of components of the steering column. Adjustment is facilitated by manipulation of an adjustment lever that is operatively coupled to the lower jacket 15. Actuation of the adjustment lever allows a user to switch the steering column between a locked condition and an unlocked condition. In the unlocked condition, a user is able to telescopingly adjust the upper jacket 12 relative to the lower jacket 15 to suit the user's preference. In the locked condition, relative movement of components of the steering column is inhibited.

Figure 3:
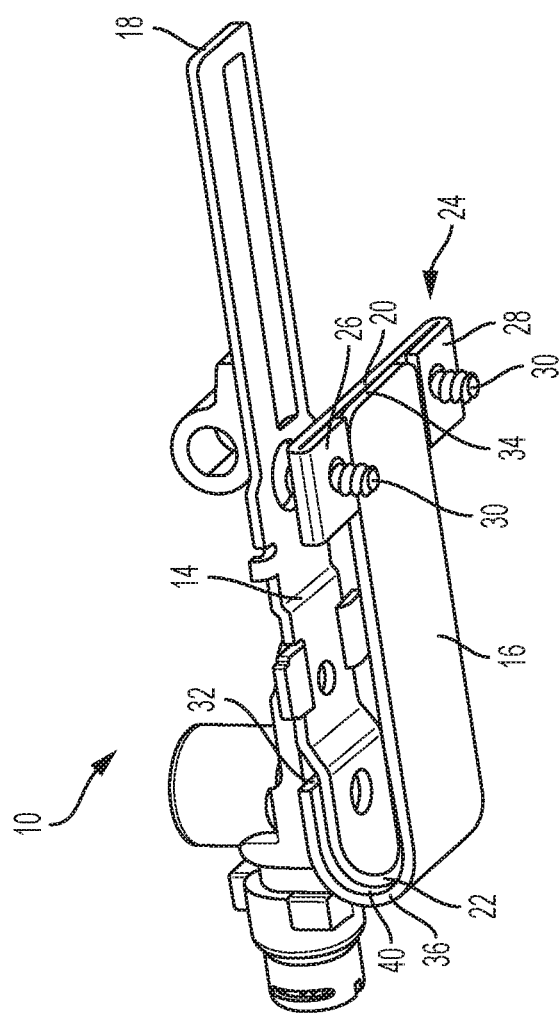
FIG. 3 is a perspective view of the energy absorption strap assembly.

Referring now to FIGS. 1-3, the EA strap assembly 10 includes a first energy absorption strap (first EA strap) 14 and a second energy absorption strap (second EA strap) 16. As will be appreciated from the disclosure herein, the first EA strap 14 may be referred to as a main strap or an inner strap, while the second EA strap 16 may be referred to as an auxiliary strap, secondary strap, or an outer strap. The EA straps 14, 16 each absorb energy during a collapse event of the steering column. At least one mechanism engages the first EA strap 14 to maintain the straps in an engaged condition that absorbs energy during a collapse event. In particular, an eccentric cam 13 is coupled to the lower jacket 15 (FIG. 5) and rotates about an axis. The eccentric cam 13 is engageable with the first EA strap 14 to lock the first EA strap 14 when the steering column position is locked (i.e., with locking of adjustment lever) to place the EA strap assembly 10 in the engaged condition. As described herein, when a high energy absorption load is required, a locking pin engages the first EA strap 14 to the second EA strap 16. However, when a lower energy absorption load is required, only one of the EA straps is required to be engaged, that being the first EA strap 14 in the illustrated embodiments. The terms inner strap and outer strap refers to the relative positioning of the "nested" orientation of the EA straps 14, 16. In particular, the inner strap 14 is surrounded by the outer strap 16.

In the illustrated embodiments of FIGS. 1 and 2, the first EA strap 14 is coupled to the upper jacket 12 proximate an upper portion thereof. However, it is to be appreciated that the EA straps 14, 16 may be positioned at any location around the steering column, such as on sides of the column, as well as on an upper or lower portion of the column. As shown, the first EA strap 14 extends from a first end 18 to a second end 20. The first EA strap 14 includes a curved portion 22 between the first end 18 and the second end 20. Proximate the second end 20 of the first EA strap 14 is at least one mounting portion 24 that facilitates coupling to the upper jacket 12. In the illustrated embodiment, two outwardly extending flange sections 26, 28 are provided for mounting to the upper jacket 12, via mechanical fasteners 30.

The second EA strap 16 extends from a first end 32 to a second end 34, with a curved portion 36 being located therebetween. In the illustrated embodiment, the second end 34 of the second EA strap 16 is located within a groove or slot 38 at least partially defined by the outwardly extending flange sections 26, 28 of the first EA strap 14. The illustrated example is merely one way to retain the second EA strap 16. The second EA strap 16 is not as long as the first EA strap 14, but the curved portion 36 of the second EA strap 16 is positioned in a nested orientation with the curved portion 22 of the first EA strap 14.

The embodiments disclosed herein eliminate the rigid connection between the EA straps 14, 16 at a moving end. Instead, features are provided that keep the EA straps 14, 16 parallel, as described herein. This facilitates two modes of operation, a high load mode and a low load mode. The load mode is determined by positioning of a locking pin 37 that is extendable and retractable. In an extended position, the locking pin 37 is within apertures of the first and second EA straps 14, 16. The extended position defines the high load mode. A retracted position removes the locking pin 37 from the second EA strap 16 to define the low load mode.

In the high load mode, the restrictions required to achieve the rolling energy is to keep the straps parallel and to lock the upper end of the second EA strap 16 to the upper end of the first EA strap 14. The groove or slot 38 (e.g., chamber) created by the first EA strap 14 and the upper jacket 12 keeps the second end 34 of the second EA strap 16 from swinging away from the first EA strap 14, thereby causing the second end 34 of the second EA strap 16 to remain in position with the end of the upper jacket 12. The second EA strap 16 must roll when the locking pin 37 is extended and engaged with the second EA strap 16. Therefore, both straps 14, 16 must unfurl in the high load mode.

When the opposite end of the second EA strap 16 is released from the grounded end (the grounded end defined as the portion locked to the lower jacket 15), the advancing mechanism for the roll is the moving roll of the first EA strap 14. Since the roll of the first EA strap 14 is advancing at half the rate of the upper jacket 12, the second EA strap 16 will also advance at half the rate. The space inside the column does not need to increase. In the low load mode, the second EA strap 16 only translates with the first EA strap 14 and does not unroll, but the translation is at the velocity of the roll, and not the jacket. Movement in either the high load mode or the low load mode includes the first EA strap 14 to impart movement on the second EA strap 16 due to a forced interface 40 between the curved portion 22 of the first EA strap 14 and the curved portion 36 of the second EA strap 16. The interface 40 results in movement of the first EA strap 14 imparting movement of the second EA strap 16.

Contemporary with the synchronized roll advancement of the first and second EA straps 14, 16, the moving end of the second EA strap 16 will actually reverse direction up the side of the upper jacket 12. A passage under the first EA strap 14 is provided to allow this. There is also added friction between the rolls (this added friction may be advantageous for achieving high EA loads).

Figure 4:
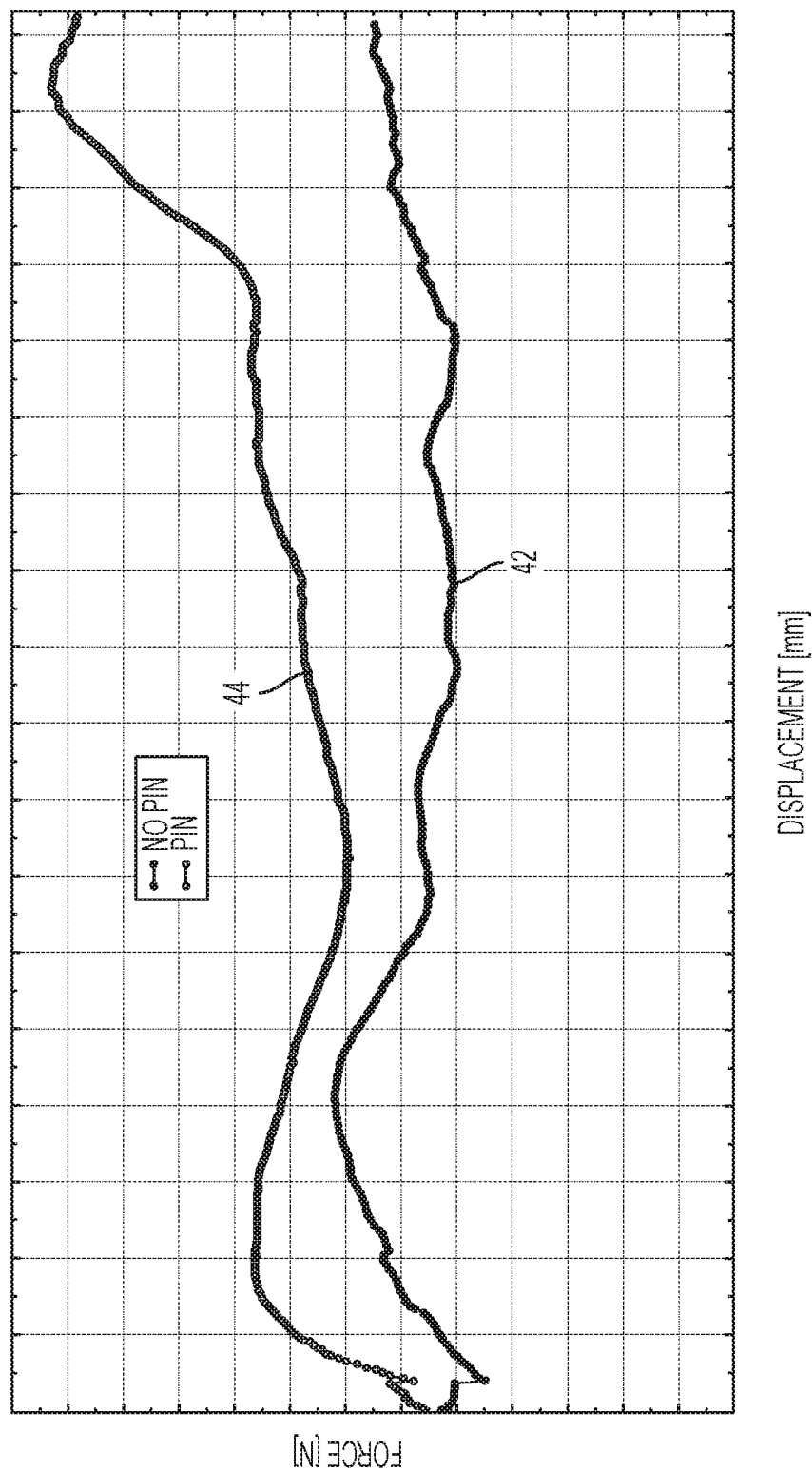
FIG. 4 is a load-displacement path of the energy absorption strap assembly in a high load condition and a low load condition.

Referring now to FIG. 4, a load-displacement curve for each load condition is illustrated. In particular, when the pin is retracted, the low load condition is provided and the associated curve is depicted and referenced with numeral 42. When the locking pin 37 is extended to provide the high load condition, the illustrated load-displacement curve is available to the system, this curve referenced with numeral 44.

The embodiments disclosed herein provide a reduction in space required for the overall EA strap assembly 10. A more compact column assembly can be devised which is desirable for packaging or mass.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An energy absorption strap assembly for a steering column, the energy absorption strap assembly comprising:
   a lower jacket
   an upper jacket coupled to the lower jacket;
   a first energy absorption strap extending from a first end to a second end, the first energy absorption strap operatively coupled to the upper jacket proximate the second end of the first energy absorption strap; and
   a second energy absorption strap surrounding a portion of the first energy absorptions strap, the second energy absorption strap not directly coupled to the upper jacket, wherein the first energy absorption strap is in a locked position, with respect to the lower jacket, when an eccentric cam is engaged with the first energy absorption strap.

2. The energy absorption strap assembly of claim 1, the first energy absorption strap including a curved portion between the first end and the second end of the first energy absorption strap, the second energy absorption strap extending from a first end to a second end, the second energy absorption strap including a curved portion between the first end and the second end of the second energy absorption strap, the curved portion of the second energy absorption strap surrounding the curved portion of the first energy absorption strap.

3. The energy absorption strap assembly of claim 2, wherein movement of the first energy absorption strap exerts an outboard force on the curved portion of the second energy absorption strap.

4. The energy absorption strap assembly of claim 2, wherein the first energy absorption strap includes a pair of outwardly extending flange sections proximate the second end of the first energy absorption strap, each of the pair of outwardly extending flange sections having a mechanical fastener extending therethrough to couple the first energy absorption strap to the upper jacket.

5. The energy absorption strap assembly of claim 4, wherein the second end of the second energy absorption strap is disposed within a groove at least partially defined by the upper jacket and the pair of outwardly extending flange sections.

6. The energy absorption strap assembly of claim 1, further comprising a locking pin moveable between an extended position and a retracted position, the locking pin extending through the second energy absorption strap in the extended position, the locking pin withdrawn from the second energy absorption strap in the retracted position, the extended position defining a high load mode of the energy absorption strap assembly, the retracted position defining a low load mode of the energy absorptions strap assembly.

7. The energy absorption strap assembly of claim 1, wherein movement of a locus of points of each of the first and second energy absorption strap occurs at half the speed of movement of the upper jacket.

8. An energy absorption strap assembly for a steering column, the energy absorption strap assembly comprising:
   a lower jacket;
   an upper jacket telescopingly engaged with the lower jacket;
   a first energy absorption strap extending from a first end to a second end, the first energy absorption strap operatively coupled to the upper jacket proximate the second end of the first energy absorption strap, the first energy absorption strap including a curved portion between the first end and the second end of the first energy absorption strap; and
   a second energy absorption strap extending from a first end to a second end, the second energy absorption strap including a curved portion between the first end and the second end of the second energy absorption strap, the curved portion of the second energy absorption strap surrounding the curved portion of the first energy absorption strap, wherein the second energy absorption strap is not directly coupled to the upper jacket, wherein the energy absorption strap is in a locked position when an eccentric cam is engaged with the first energy absorption strap.

9. The energy absorption strap assembly of claim 8, wherein movement of the first energy absorption strap exerts an outboard force on the curved portion of the second energy absorption strap.

10. The energy absorption strap assembly of claim 9, wherein the first energy absorption strap includes a pair of outwardly extending flange sections proximate the second end of the first energy absorption strap, each of the pair of outwardly extending flange sections having a mechanical fastener extending therethrough to couple the first energy absorption strap to the upper jacket.

11. The energy absorption strap assembly of claim 10, wherein the second end of the second energy absorption strap is disposed within a groove at least partially defined by the upper jacket and the pair of outwardly extending flange sections.

12. The energy absorption strap assembly of claim 8, further comprising a locking pin moveable between an extended position and a retracted position, the locking pin extending through the second energy absorption strap in the extended position, the locking pin withdrawn from the second energy absorption strap in the retracted position, the extended position defining a high load mode of the energy absorption strap assembly, the retracted position defining a low load mode of the energy absorptions strap assembly.

13. The energy absorption strap assembly of claim 8, wherein movement of a locus of points of each of the first and second energy absorption strap occurs at half the speed of movement of the upper jacket.

* * * * *